United States Patent
Arcot et al.

(10) Patent No.: US 7,448,483 B2
(45) Date of Patent: Nov. 11, 2008

(54) CLUTCH COOLING GROOVES FOR UNIFORM PLATE TEMPERATURE IN FRICTION LAUNCH

(75) Inventors: Murali Krishnan S. Arcot, Ypsilanti, MI (US); Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 313 days.

(21) Appl. No.: 11/078,258

(22) Filed: Mar. 11, 2005

(65) Prior Publication Data

US 2005/0284721 A1 Dec. 29, 2005

Related U.S. Application Data

(60) Provisional application No. 60/582,865, filed on Jun. 25, 2004.

(51) Int. Cl.
*F16D 13/72* (2006.01)
*F16D 13/64* (2006.01)

(52) U.S. Cl. .............................. 192/113.36; 182/70.12; 182/70.14; 182/107 R (58) Field of Classification Search ............. 192/113.36
See application file for complete search history.

(56) References Cited

U.S. PATENT DOCUMENTS

| | | | | |
|---|---|---|---|---|
| 4,995,500 A | * | 2/1991 | Payvar | ................... 192/107 R |
| 5,460,255 A | * | 10/1995 | Quigley | ................. 192/113.36 |
| 5,799,763 A | * | 9/1998 | Dehrmann | ................. 192/3.29 |
| 6,499,579 B2 | * | 12/2002 | Ono et al. | ............... 192/113.36 |
| 6,557,685 B2 | * | 5/2003 | Hattori | ..................... 192/70.12 |
| 6,712,190 B2 | * | 3/2004 | Kitaori et al. | ........... 192/113.36 |
| 7,014,024 B2 | * | 3/2006 | Nels et al. | ................. 192/70.12 |
| 2002/0038748 A1 | * | 4/2002 | Gu | ........................... 192/70.14 |
| 2005/0217965 A1 | * | 10/2005 | Muranaka et al. | ...... 192/113.36 |

* cited by examiner

*Primary Examiner*—Rodney H Bonck (57) ABSTRACT

Clutch cooling grooves formed on a friction plate are provided. The grooves are shaped to provide for substantially uniform steel disk temperatures in friction launch of a vehicle. The grooves are shaped such that the largest cross-sectional area is located adjacent to what would otherwise have been a hot area on the steel disk and the smallest cross-sectional area is located at the coolest location on the steel disk, at the cooling fluid inlet. Thus, the groove is shaped such that the smallest cross-sectional area is located at the cooling fluid inlet, the largest cross-sectional area is located between the cooling fluid inlet and the cooling fluid outlet, and the cooling fluid outlet has a cross-sectional area larger than the cooling fluid inlet and smaller than the cross-sectional area adjacent to the hot spot of the steel disk, between the cooling fluid inlet and the cooling fluid outlet.

11 Claims, 7 Drawing Sheets

GROOVE AREA AND TEMPERATURE RANGE DISTRIBUTION

| ID | TYPE | TOTAL AREA | GROOVES | ELEMENT | AREAS | AREA% | TEMPS IN DEG C | TEMP-STEEL | TEMP-OIL | TEMP-CORE |
|---|---|---|---|---|---|---|---|---|---|---|
| A | POT | 297 mm² | 90.68 mm² 30.53%9 | 1 | 4.97 | 5.49 | RANGE - 1 LAUNCH | 78.94 | 57.07 | 40.85 |
| | | | | 2 | 5.94 | 6.55 | | | | |
| | | | | 3 | 10.92 | 12.04 | RANGE - MULTIPLE LAUNCHES | 85.83 | 61.95 | 44.32 |
| | | | | 4 | 14.52 | 16.02 | | | | |
| | | | | 5 | 14.74 | 16.25 | MAX - 1 LAUNCH | 270.92 | 190.14 | 183.14 |
| | | | | 6 | 13.26 | 14.62 | | | | |
| | | | | 7 | 10.82 | 11.93 | MAX - MULTIPLE LAUNCHES | 283.1 | 195.27 | 187.88 |
| | | | | 8 | 8.36 | 9.21 | | | | |
| | | | | 9 | 7.14 | 7.87 | | | | |
| | | | | TOTAL | 90.66 | 99.98 | | | | |
| B | INVERTED Y-1 | 297 mm² | 87.43 mm² | 1 | 4.97 | 5.69 | RANGE - 1 LAUNCH | 82.92 | 55.81 | 39.07 |
| | | | | 2 | 5.94 | 6.79 | | | | |
| | | | | 3 | 10.92 | 12.49 | RANGE - MULTIPLE LAUNCHES | 90.43 | 60.72 | 42.58 |
| | | | | 4 | 15.24 | 17.44 | | | | |
| | | | | 5 | 13.92 | 15.93 | MAX - 1 LAUNCH | 273.73 | 188.88 | 181.49 |
| | | | | 6 | 11.70 | 13.38 | | | | |
| | | | | 7 | 9.98 | 11.42 | MAX - MULTIPLE LAUNCHES | 286.59 | 194.05 | 186.28 |
| | | | | 8 | 7.62 | 8.77 | | | | |
| | | | | 9 | 6.22 | 7.11 | | | | |
| | | | | TOTAL | 86.56 | 99.01 | | | | |
| C | INVERTED Y-2 | 297 mm² | 91.49 mm² | 1 | 4.97 | 5.44 | RANGE - 1 LAUNCH | 76.25 | 56.97 | 41.92 |
| | | | | 2 | 5.94 | 6.49 | | | | |
| | | | | 3 | 8.27 | 9.04 | RANGE - MULTIPLE LAUNCHES | 82.92 | 61.88 | 45.37 |
| | | | | 4 | 11.91 | 13.02 | | | | |
| | | | | 5 | 15.64 | 17.10 | MAX - 1 LAUNCH | 268.11 | 190.1 | 183.55 |
| | | | | 6 | 15.66 | 17.11 | | | | |
| | | | | 7 | 11.37 | 12.42 | MAX - MULTIPLE LAUNCHES | 280.1 | 195.27 | 188.32 |
| | | | | 8 | 8.68 | 9.49 | | | | |
| | | | | 9 | 8.64 | 9.44 | | | | |
| | | | | TOTAL | 91.09 | 99.56 | | | | |
| D | INVERTED Y-3 | 297 mm² | 91.18 mm² | 1 | 4.9739 | 5.45 | RANGE - 1 LAUNCH | 76.92 | 56.75 | 41.59 |
| | | | | 2 | 5.9403 | 6.51 | | | | |
| | | | | 3 | 8.2915 | 9.09 | RANGE - MULTIPLE LAUNCHES | 83.7 | 61.65 | 45.05 |
| | | | | 4 | 11.8742 | 13.02 | | | | |
| | | | | 5 | 15.4262 | 16.92 | MAX - 1 LAUNCH | 268.58 | 189.88 | 183.25 |
| | | | | 6 | 16.0715 | 17.63 | | | | |
| | | | | 7 | 10.9973 | 12.06 | MAX - MULTIPLE LAUNCHES | 280.68 | 195.05 | 188.02 |
| | | | | 8 | 8.3846 | 9.20 | | | | |
| | | | | 9 | 8.4088 | 9.22 | | | | |
| | | | | TOTAL | 90.37 | 99.11 | | | | |

CLUTCH COOLING GROOVES FOR UNIFORM PLATE TEMPERATURE IN FRICTION LAUNCH

CROSS REFERENCE TO RELATED APPLICATIONS

This application claims the benefit of U.S. Provisional Application No. 60/582,865 filed Jun. 25, 2004, which is hereby incorporated by reference in its entirety.

TECHNICAL FIELD

The invention relates to clutch cooling grooves in a friction launch clutch.

BACKGROUND OF THE INVENTION

An integrated friction launch clutch may be used instead of a torque converter as a coupling device in an automatic transmission during the vehicle launch process. A launch clutch usually comprises a pack of steel disks splined to a housing and friction plates splined to a hub, arranged alternately to provide disk-plate contact interfaces. The friction plates are comprised of a thin plate with friction material, segmented or un-segmented, attached on at least one side of the friction plate. A piston applies the clutch during vehicle launch. A launch clutch is slipped for a longer time than a shifting clutch. Thus, the heat generated in a launch clutch is higher than in a shifting clutch and efficient cooling is required to maintain acceptable steel disk and cooling fluid temperatures.

Grooves may be formed in the friction material so that cooling fluid, which is often oil, can flow through the grooves either from the friction plate outer peripheral edge to the friction plate inner peripheral edge, or from the friction plate inner peripheral edge to the friction plate outer peripheral edge. Heat generated in the steel disks is dissipated by conduction to the cooling fluid as the cooling fluid passes through the grooves and along the disk outer peripheral edge and disk inner peripheral edge. Insufficient cooling can result in undesirably high temperatures in the steel disk and in the cooling fluid, which may cause damage to the steel and friction material. It may also cause a break down of the base stock and additives in the cooling fluid. Improper cooling in the steel disk can cause localized hot areas or "hot spots," which may result in distortion and damage to the steel disk and the friction material. Damage at the disk-friction material interface can adversely affect durability or function. The types of damage affecting durability include "burned" friction material, distorted steel plates, oxidized oil, and additive depletion in oil. The types of damage affecting functionality include changes in friction characteristics near the hot area that can lead to shudder and rapid reduction in torque capacity. A hot area can cause damage to the steel disk, the friction material, and the cooling fluid even if the average temperature of the material is within acceptable limits.

SUMMARY OF THE INVENTION

The present invention reduces the maximum temperature of the steel disks in a clutch, particularly at the interfaces between the steel disks and the friction material, by varying the shape of cooling grooves formed in friction plates, juxtaposed to the steel disks. The present invention also provides a method of maintaining uniform or near-uniform temperatures in the steel plates near the interfaces between the steel disks and the friction material by varying the shape of the cooling grooves. Reduced temperatures in the steel disks are beneficial for durability and functionality reasons. Primarily, reduced temperatures minimize heat distortion of the steel disks and oxidation of fluid and friction material.

Three major factors drive the temperature gradients in the steel disks. First, each disk inner peripheral edge and disk outer peripheral edge is not subject to heat generation due to sliding contact. Second, each disk inner peripheral edge and disk outer peripheral edge has more area exposed to the cooling fluid as it has area that is not covered by the friction material of the plate assembly. Third, the cooling fluid entering the grooves is cooler than the cooling fluid exiting the grooves due to the heat transfer to the cooling fluid from the steel disks.

To maintain near-constant temperatures in the steel disks at the interfaces between the steel disks and the friction material (the disk-friction material interfaces), the cross-sectional area of each groove is increased in areas where the steel disk temperatures would be above average if the cross-sectional area were not increased. The cross-sectional area of each groove is, thus, smallest at the cooling fluid inlet, where the cooling fluid is the coolest and the disk peripheral edge has area that is not covered with friction material and is exposed to the cooling fluid; wider at the cooling fluid outlet, where the cooling fluid is hottest and the disk peripheral edge has area that is not covered with friction material and is exposed to the cooling fluid; and widest adjacent the hot areas in the steel disks, where the cooling fluid is hotter than at the fluid inlet but cooler than at the cooling fluid outlet and there is no disk peripheral edge to enhance cooling. Any groove shape that has the smallest cross-sectional area at the cooling fluid inlet and the largest cross-sectional area in the area between the cooling fluid inlet and the cooling fluid outlet is within the scope of the present invention and can be further adapted to increase its efficiency by other factors, such as minimizing the distance from the center of the friction material to the grooves to allow for more heat transfer from the steel disk to the cooling fluid.

The present invention includes a friction plate adapted for use in a clutch assembly. The friction plate is utilized in association with a steel disk having a disk inner peripheral edge, a disk outer peripheral edge, and a disk facing surface. The friction plate has a friction plate facing surface juxtaposed with the disk facing surface. The friction plate facing surface has a plurality of grooves formed to carry cooling fluid from one of the friction plate inner peripheral edge and the friction plate outer peripheral edge to the other of the friction plate inner peripheral edge and the friction plate outer peripheral edge. The grooves are formed to enhance cooling of the steel disk. Each groove has a groove inlet cross-sectional area, a groove central cross-sectional area, and a groove outlet cross-sectional area. The groove outlet cross-sectional area is larger than the groove inlet cross-sectional area and the groove central cross-sectional area is larger than the groove outlet cross-sectional area. This groove shape provides that the largest cross-sectional area of each groove is adjacent to what would otherwise be a hot area of the steel disk, which has the effect of reducing the temperature at the hot area. Thus, the amount of heat transferred from the expected hot areas into the cooling fluid is substantially greater than the amount of heat transferred at other locations along the grooves into the cooling fluid.

The present invention provides a method producing a more even temperature distribution in a clutch where cooling fluid is directed in a groove on a friction plate, which is adjacent to a steel disk. The cooling fluid is directed from one of the friction plate inner peripheral edge and the friction plate outer peripheral edge to the other of the friction plate inner peripheral edge and the friction plate outer peripheral edge. The groove is adjacent to the steel disk. The cooling fluid is directed through the groove to traverse the smallest cross-sectional area of the groove at the cooling fluid inlet, to traverse a larger cross-sectional area of the groove at the cooling fluid outlet, and to traverse the largest cross-sectional area of the groove at a location between the cooling fluid inlet and the cooling fluid outlet.

The present invention provides a clutch assembly comprised of a friction plate with a friction plate facing surface juxtaposed with a disk facing surface of a steel disk. The steel disk has a disk inner peripheral edge and a disk outer peripheral edge. The friction plate facing surface has a plurality of grooves formed therein to carry cooling fluid from one of the friction plate inner peripheral edge and the friction plate outer peripheral edge to the other of the friction plate inner peripheral edge and the friction plate outer peripheral edge. The grooves are formed to enhance cooling of the steel disk. The grooves have a groove shape such that the grooves have the largest groove cross-sectional area adjacent to what would be a hot area of the steel disk if the groove area was constant. Each groove may have one or more branches for the cooling fluid to flow. Additionally, each groove may have two or more openings to the friction plate inner peripheral edge and/ or the friction plate outer peripheral edge.

The present invention is a method of designing a plurality of grooves in a friction plate adapted for use in a clutch in connection with a steel disk. The friction plate has a friction plate facing surface with friction material and grooves formed therein to carry cooling fluid. Each groove has a plurality of groove segments where each groove segment is arranged adjacent in a direction radially outward from an axis of the friction plate. The method includes the steps of dividing the steel disk into a plurality of steel disk finite elements along the disk-cooling fluid interface and dividing the cooling fluid into a plurality of cooling fluid finite elements along the disk-cooling fluid interface. The method also includes utilizing the steel disk finite elements and the cooling fluid finite elements to determine a temperature profile for the steel disk and the cooling fluid; utilizing a plurality of discrete time steps to determine a distribution of steel disk temperature, utilizing known input temperatures, fluid flows, and input power to calculate individual finite element temperatures for each increase in each of the discrete time steps; and selecting a value of groove segment cross-sectional area for the groove segments to provide for near-uniform temperature in each of the steel disk finite elements.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 8 is a tabular illustration of the groove areas and temperature range distributions of the embodiments of the friction plates shown in FIGS. 4a-7b.

DESCRIPTION OF THE PREFERRED EMBODIMENTS

An example of clutch reaction plates with cooling flow paths is described in published U.S. patent application Ser. No. 10/366,911 (U.S. Patent Publication No. 2004-0159519), filed on Feb. 14, 2003, assigned to General Motors Corporation, and hereby incorporated by reference in its entirety.

Figure 1A:
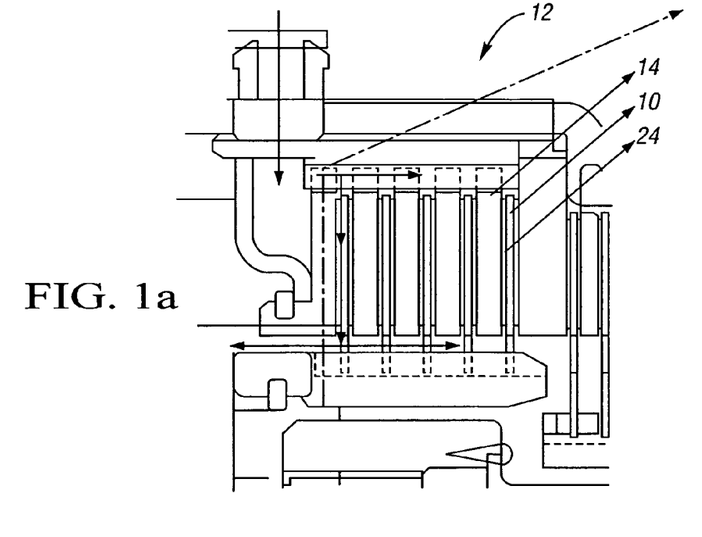
FIG. 1a is a partial cross-sectional view of a clutch assembly.
Figure 1B:
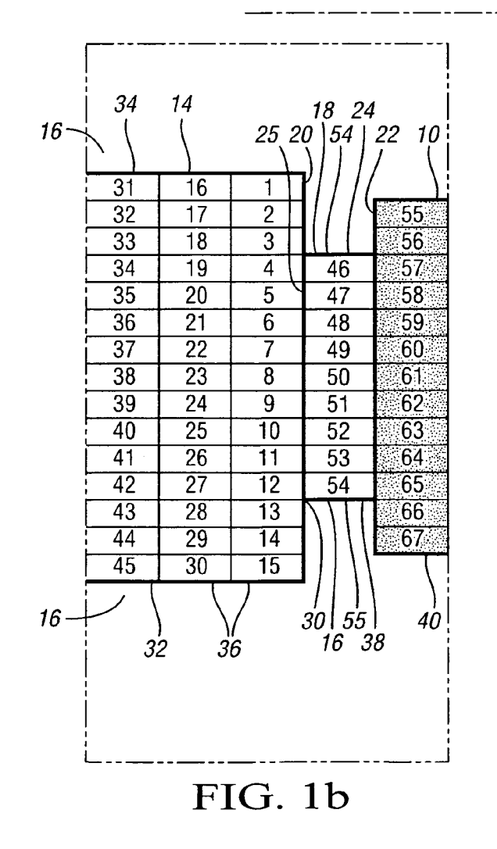
FIG. 1b is a schematic partial cross-sectional representation of elements of the clutch assembly used in a finite element analysis to design a groove shape for a friction plate.
Figure 1C:
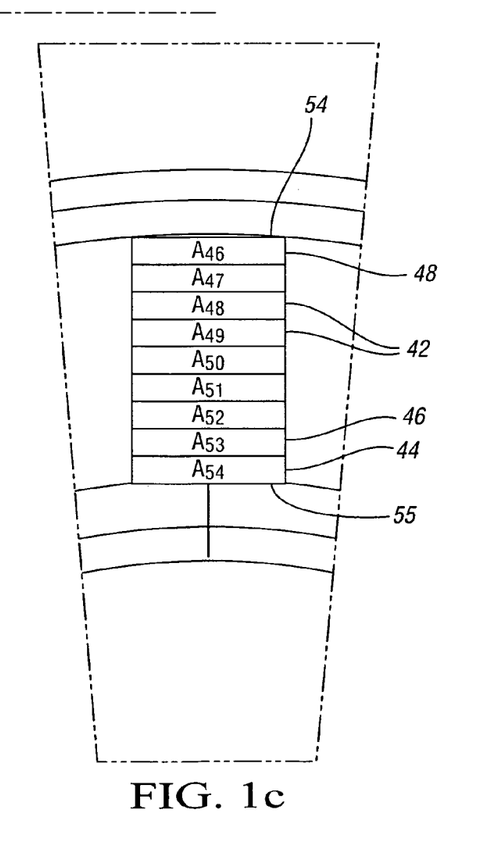
FIG. 1c is a schematic partial plan view representation of a friction plate.

Referring to the drawings, FIGS. 1a, 1b, and 1c are diagrammatic representations of a clutch 12, which includes steel disks 14, cooling fluid 16, friction plates 10 such as 10', 10'', 10''', 10'''', and friction material 24. The steel disks 14 have a disk facing surface 20 juxtaposed with the friction plate facing surface 22 of the friction plates 10. The friction plate facing surface 22 is at least partially faced with friction material 24. Heat is generated along the disk-friction material interface 30 while the clutch 12 is slipping with friction between the disk facing surface 20 and the friction material facing surface 25 of the friction material 24, which is in contact with the disk facing surface 20. Grooves 18 such as 18', 18'', 18''', 18'''' may be formed in the friction material 24 by cutting, pressing, etc. The grooves 18 allow for cooling fluid 16, which is conventionally oil, to flow through the grooves 18 and draw heat that is produced out of the steel disks 14 at the disk facing surface 20. Cooling fluid 16 may flow in a direction from the friction material outer peripheral edge 54 to the friction material inner peripheral edge 55 or from the friction material inner peripheral edge 55 to the friction material outer peripheral edge 54. When the cooling fluid 16 flows from the friction material outer peripheral edge 54 to the friction material inner peripheral edge 55, the cooling fluid inlet is located at the friction material outer peripheral edge 54 and the cooling fluid outlet is located at the friction material inner peripheral edge 55. Conversely, when the cooling fluid 16 flows from the friction material inner peripheral edge 55 to the friction material outer peripheral edge 54, the cooling fluid inlet is located at the friction material inner peripheral edge 55 and the cooling fluid outlet is located at the friction material outer peripheral edge 54.

Three major factors drive the temperature gradients in the steel disks 14. First, the disk inner peripheral edge 32 and disk outer peripheral edge 34 are not in sliding contact with the friction material 24 and, thus, are not subject to heat generation. Second, the disk inner peripheral edge 32 and disk outer peripheral edge 34 have more area exposed to the cooling fluid 16 than the disk facing surface 20. Third, the cooling fluid 16 entering the grooves 18 is cooler than the cooling fluid 16 exiting the grooves 18 due to the heat transfer to the cooling fluid 16 from the steel disks 14 at the disk facing surface 20.

Figure 2:
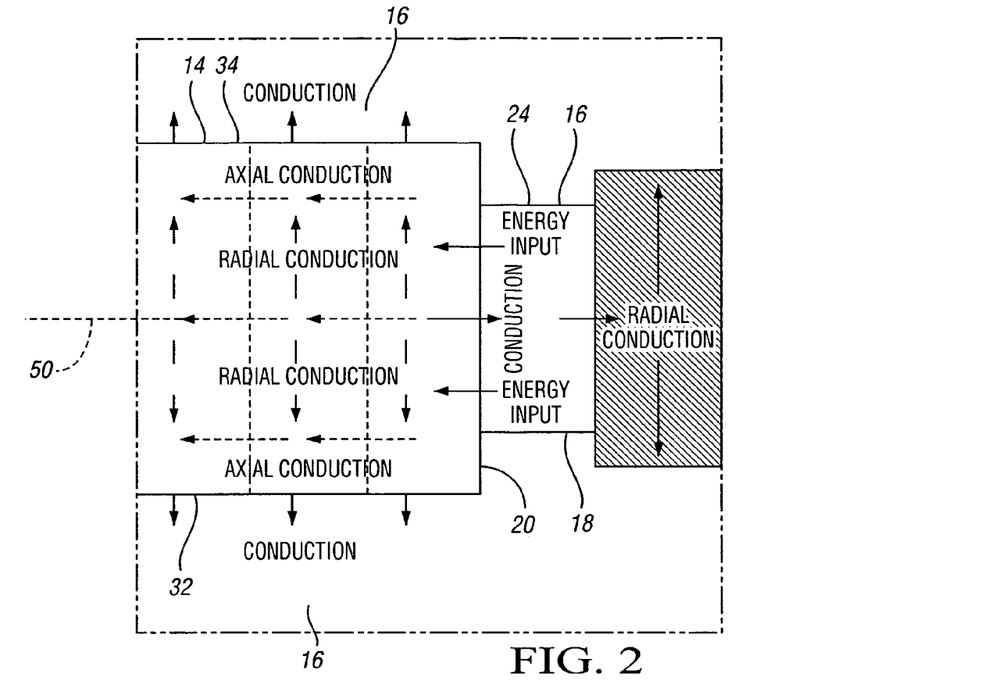
FIG. 2 is a schematic cross-sectional partial view of the energy distribution and heat transfer in a friction launch clutch pack.

The heat transfer and energy distribution in the clutch 12 near the disk-friction material interface 30 is shown in FIG. 2. As illustrated, conduction occurs from the disk inner peripheral edge 32 to the cooling fluid 16, from the disk outer peripheral edge 34 to the cooling fluid 16, and from the disk facing surface 20 to the cooling fluid 16 in the groove 18. Axial conduction occurs in the steel disks 14 in a direction away from the disk facing surface 20 and parallel to the disk inner peripheral edge 32 and the disk outer peripheral edge 34. Radial conduction occurs in a direction away from the steel disk central plane 50 toward the disk inner peripheral edge 32 and from the steel disk central plane 50 toward the disk outer peripheral edge 34.

Referring back to FIG. 1b, to maintain a substantially uniform temperature in the steel disks 14 near the disk-friction material interface 30, the cross-sectional areas of the grooves 18 formed in the friction plates 10 are increased adjacent to the hot areas (or expected hot areas) on the steel disks 14. The cross-sectional areas of the grooves 18 are defined along a plane perpendicular to the views illustrated in FIGS. 1a, 1c, 2, and 4a-7b. Thus, the groove 18 cross-sectional areas are essentially perpendicular to the friction material inner peripheral edge 55 and the friction material outer peripheral edge 54 as viewed in FIG. 1b. The groove inlet cross-sectional area is the cross-sectional area of the groove at the groove inlet (which may be at the friction material outer or inner peripheral edge 54, 55) perpendicular to the cooling fluid flow. The groove outlet cross-sectional area is the cross-sectional area of the groove at the groove outlet (which may be at the friction material outer or inner peripheral edge 54, 55) perpendicular to the cooling fluid flow. The groove central cross-sectional area is the cross-sectional area of a third point located along the groove between the groove inlet (which may be at the friction material outer or inner peripheral edge 54, 55) and groove outlet. (which may be at the friction material outer or inner peripheral edge 54, 55) perpendicular to the cooling fluid flow. Hot areas, or "hot spots", are localized areas of increased temperatures, which typically develop on steel disks 14 near the disk facing surface 20 and near the center of the disk-friction material interface 30, for example near finite elements 7-11 shown in FIG. 1b. There exists a maximum percentage of the friction material facing surface 25 that may be comprised of groove 18 area as opposed to being comprised of friction material 24 while maintaining acceptable contact stress. Thus, increasing the cross-sectional area of the groove 18 at one location along the groove 18 requires a reduction in the cross-sectional area an another location along the groove 18 to maintain the required amount of friction material 24 on the friction material facing surface 25 for effective clutching.

The cross-sectional area of the groove 18 is smallest at the cooling fluid inlet (which may be at the friction material outer peripheral edge 54 or the friction material inner peripheral edge 55), where the cooling fluid 16 is the coolest and the peripheral edge (which may be the disk outer peripheral edge 34 or the disk inner peripheral edge 32) has area that is not covered with friction material 24 and is exposed to the cooling fluid 16. The cross-sectional area of the groove 18 is wider at the cooling fluid outlet (which may be at the friction material outer peripheral edge 54 or the friction material inner peripheral edge 55), where the cooling fluid 16 is hottest and the peripheral edge (which may be the disk outer peripheral edge 34 or the disk inner peripheral edge 32) has area that is not covered with friction material 24 and is exposed to the cooling fluid 16. The cross-sectional area of the groove 18 is the widest adjacent to the expected hot areas on the steel disk 14, which are located between the disk inner peripheral edge 32 and the disk outer peripheral edge 34, where the cooling fluid 16 is hotter than at the cooling fluid inlet (which may be at the friction material outer peripheral edge 54 or the friction material inner peripheral edge 55) but cooler than at the cooling fluid outlet (which may be at the friction material outer peripheral edge 54 or the friction material inner peripheral edge 55) and there is no peripheral edge 32, 34 to enhance cooling. In summary, the groove outlet cross-sectional area is larger than the groove inlet cross-sectional area and the groove central cross-sectional area is larger than the groove outlet cross-sectional area.

Figure 3:
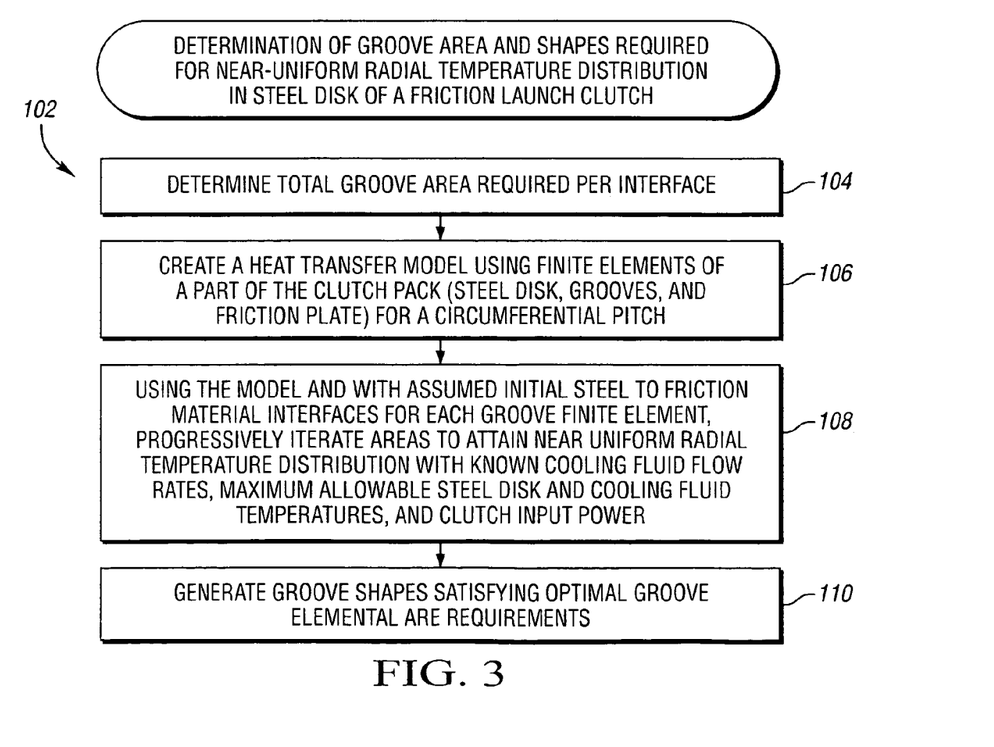
FIG. 3 is a flowchart of the steps involved in designing a groove shape using finite element analysis.

The grooves 18 may be designed with finite element analysis using a heat transfer model. A flowchart 102 of the steps involved in arriving at a groove 18 shape for attaining a substantially uniform steel disk 14 temperature distribution is shown in FIG. 3. Step one 104 of the finite element method of designing a groove 18 is to determine the total groove area required per interface. This step takes into account that a certain percentage of the friction material 24 at the disk-friction material interface 30 must be comprised of friction material 24, as opposed to groove 18 area, to allow for effective clutching but must also have sufficient groove 18 area to allow for cooling fluid 16 to cool the steel disks 14, as defined in FIG. 1b. Referring back to FIG. 3, step two 106 of the method is to create a heat transfer model of a part of the clutch 12 for a circumferential pitch using steel disk finite elements 36, groove finite elements 38, and friction plate finite elements 40. Examples of finite elements 36, 38, 40 are shown as elements 1-67 in FIG. 1b. It is imperative to recognize that the numbers 1 through 67 that denote each illustrated element are not related to the reference numbers that refer to other aspects of the invention. For example, finite element 48 illustrated in FIG. 1b is not related to reference number 48 in FIG. 1c. In a preferred embodiment of the present invention, and as shown in FIG. 1b, there are approximately 40-50 steel disk finite elements, approximately 5-15 groove finite elements, and approximately 8-18 friction plate finite elements. Referring back to FIG. 3, step three 108 of the method is to utilize the model created in step two 106 with an assumed initial disk-friction material interface 30 for each groove finite element 38 and to progressively iterate areas to attain near-uniform radial temperature distribution using known cooling fluid 16 flow rates, a maximum allowable steel disk 14 temperature, a maximum allowable cooling fluid 16 temperature, and clutch 12 input power, where power is defined as torque multiplied by slip speed. The clutch 12 power in a launch clutch 12 will generally decrease over time to zero at lock-up. Finally, step four 110 of the method is to generate groove 18 shapes satisfying optimal groove 18 elemental area requirements.

Referring to FIGS. 1a and 1b, the finite element analysis can be based on a number of assumptions, including: energy input to the clutch 12 is only due to the power of the clutch 12, which varies with time, for the derived launch time; all input energy is transferred to the steel disks 14 as heat in finite time, where finite time is the length of clutch slip time and not the time for the system to reach equilibrium; axial and radial conduction of heat occurs in the steel disks 14 in finite time; heat is dissipated by conduction from the steel disks 14 to the cooling fluid 16 flowing through the grooves 18 and the cooling fluid 16 in contact with the steel disks 14 at the disk outer peripheral edge 34 and disk inner peripheral edge 32; radial conduction occurs in the friction plate 10 in finite time; the friction material 24 is a perfect insulator; cooling fluid 16 retained in the friction material 24 due to porosity is neglected; and any change in density and viscosity of the cooling fluid 16 is neglected.

The shape of the grooves 18 may be varied in accordance with the above requirements. The grooves 18 may be any formation of open space that interconnects the friction material outer peripheral edge 54 and the friction material inner peripheral edge 55 and may include one or more channels and one or more openings to both the friction material outer peripheral edge 54 and the friction material inner peripheral edge 55.

Referring to FIGS. 1c and 4a-7b, in designing a groove 18 shape, the groove 18 may be characterized by a plurality of groove segments 42 such as 42', 42'', 42''', 42'''' arranged radially from the axis 52 such as 52', 52'', 52''' of the friction plate 10. The axis 52 may exist as a central axis of the friction plate 10 or otherwise. The first of the groove segments 44 such as 44', 44'', 44''', 44'''' is adjacent to the friction material inner peripheral edge 55 such as 55', 55'', 55''', 55''''; the second groove segment 46 such as 46', 46'', 46''', 46'''' is adjacent the first groove segment 44; and the last groove segment 48 such as 48', 48'', 48''', 48'''' is adjacent to the friction material outer peripheral edge 54 such as 54', 54'', 54''', 54'''', as shown as $A_{46}$-$A_{54}$ in FIG. 1c. The groove segments 42 may be used in designing a groove 18 shape by designating percentages of the overall groove 18 area to each groove segment 42, as shown in FIGS. 4b, 5b, 6b, and 7b.

Figure 4A:
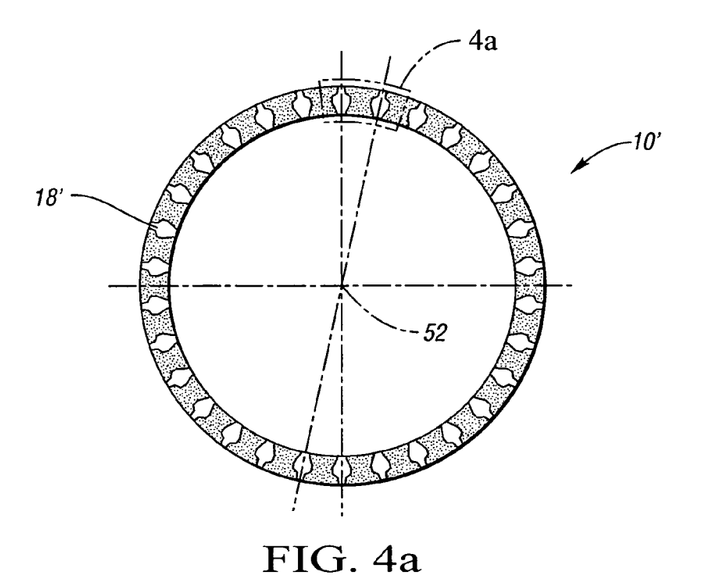
FIG. 4a shows a plan view of a friction disk in accordance with a first embodiment of the present invention.
Figure 4B:
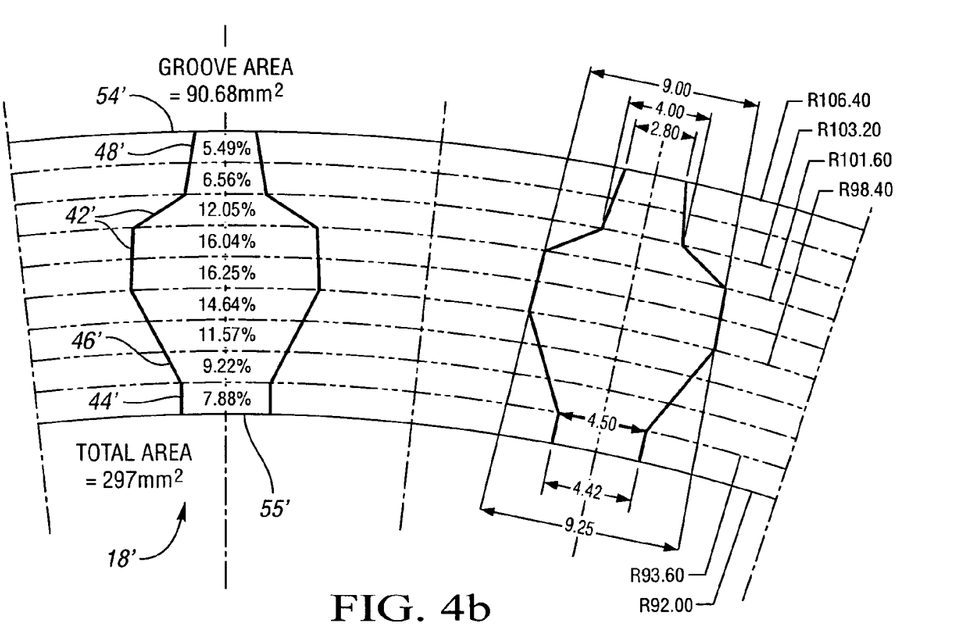
FIG. 4b shows an enlarged plan view of a friction disk groove in accordance with a first embodiment of the present invention.
Figure 5A:
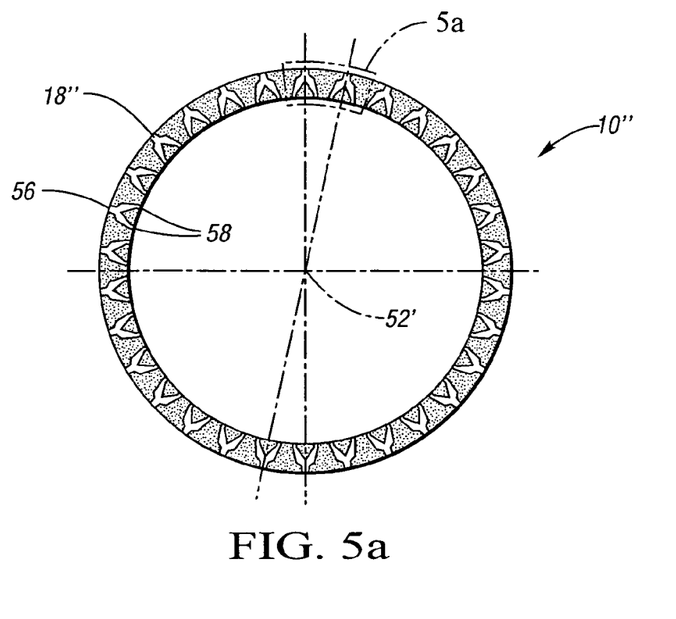
FIG. 5a shows a plan view of a friction disk in accordance with a second embodiment of the present invention.
Figure 5B:
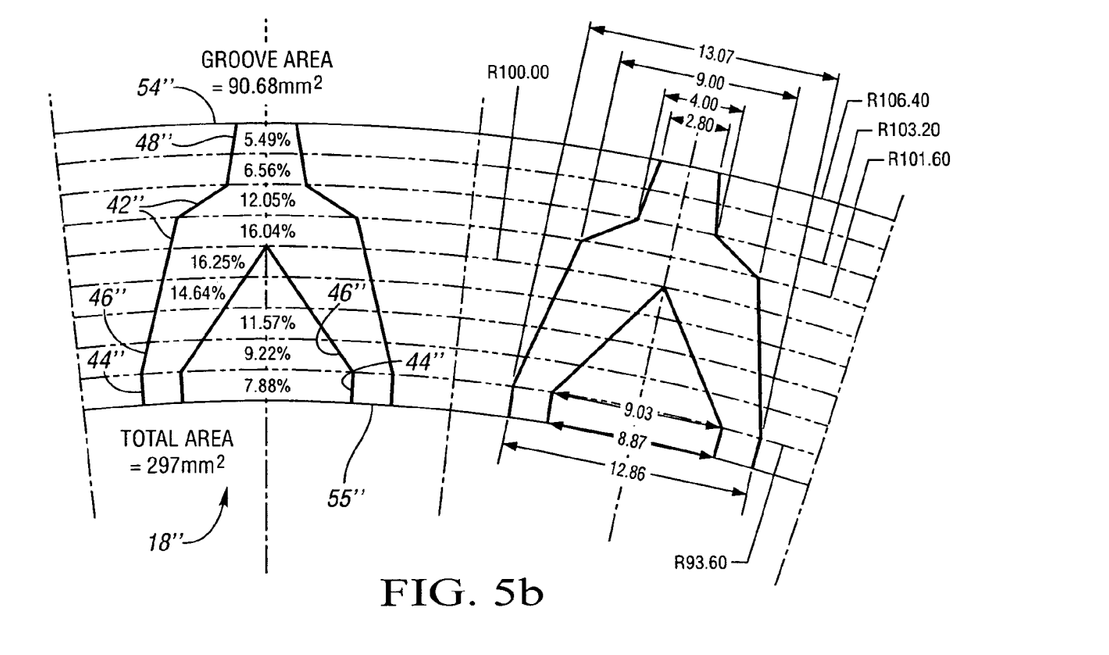
FIG. 5b shows an enlarged plan view of a friction disk groove in accordance with a second embodiment of the present invention.
Figure 6A:
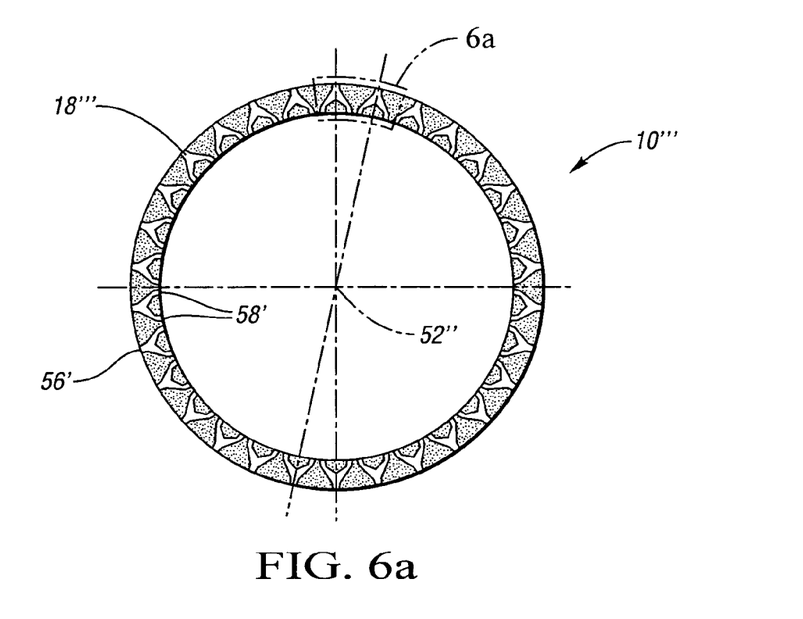
FIG. 6a shows a plan view of a friction disk in accordance with a third embodiment of the present invention.
Figure 6B:
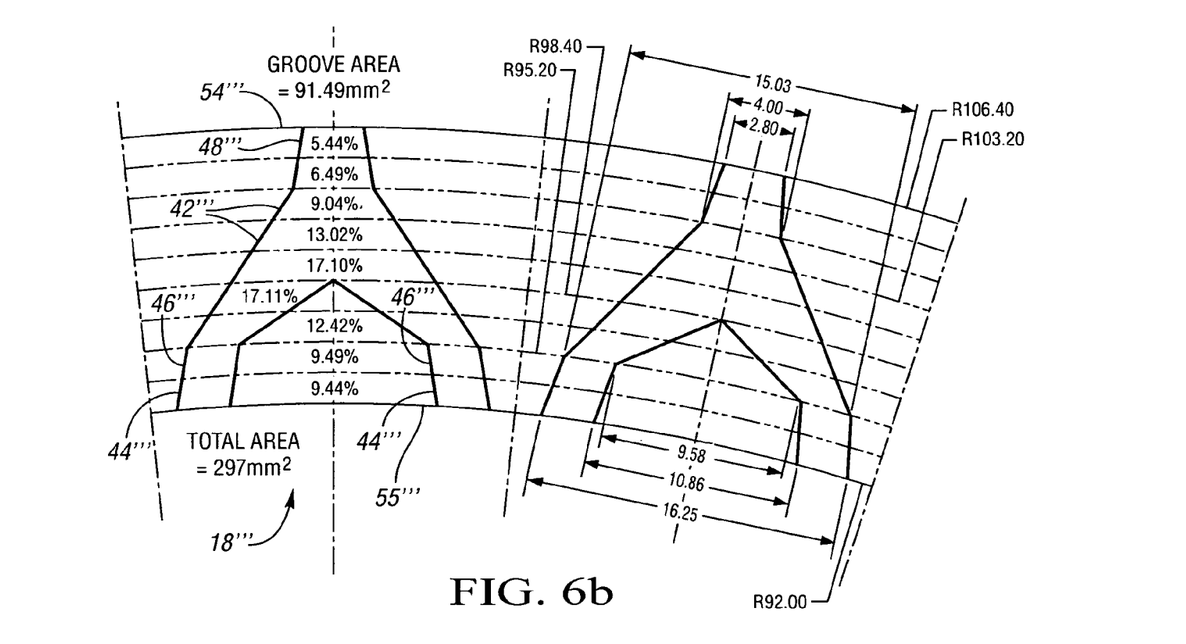
FIG. 6b shows an enlarged plan view of a friction disk groove in accordance with a third embodiment of the present invention.
Figure 7A:
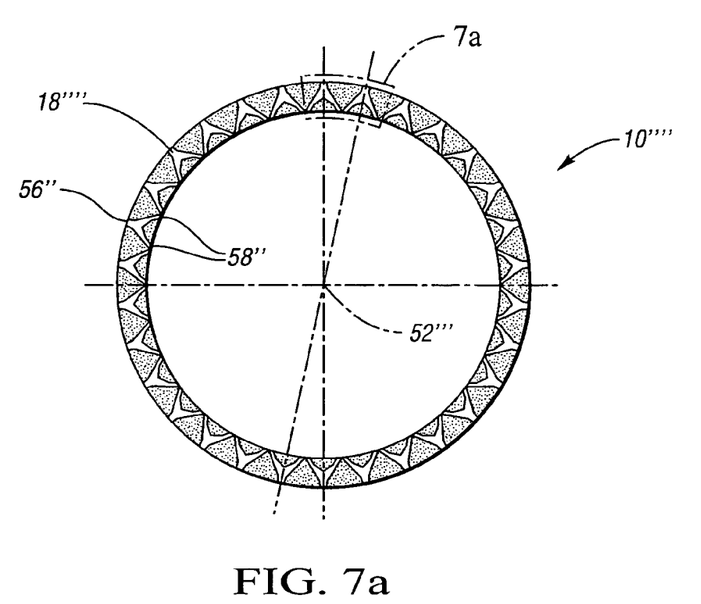
FIG. 7a shows a plan view of a friction disk in accordance with a fourth embodiment of the present invention.
Figure 7B:
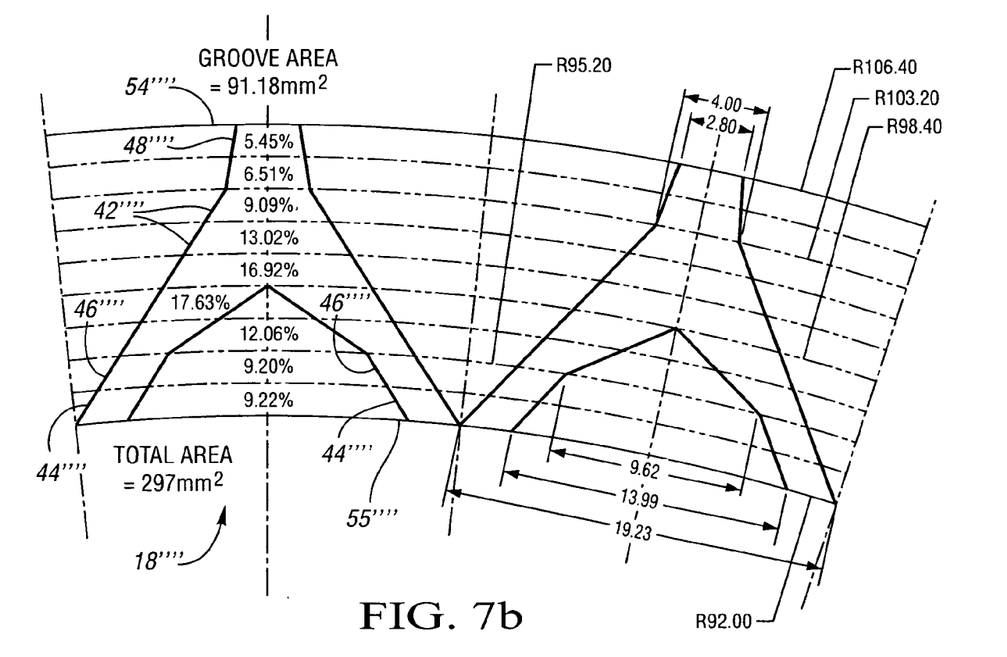
FIG. 7b shows an enlarged plan view of a friction disk groove in accordance with a fourth embodiment of the present invention.

FIG. 4a shows a first embodiment of the steel disk 10' wherein the groove 18' is a "pot" shape, where "pot" is used to describe the general overall shape of the groove 18'. FIG. 4b is an enlarged view of the first embodiment of the steel disk 10' showing groove segments 42', 44', 46', 48' and each percentage of the entire groove 18' that is located within each groove segment 42', 44', 46', 48'. FIG. 5a shows a second embodiment of the steel disk 10'' wherein the groove 18'' is an "inverted Y-1" shape, where "inverted Y" refers to the groove 18'' shape wherein one groove inlet 56 branches into two groove outlets 58. FIG. 5b is an enlarged view of the second embodiment of the steel disk 10'' showing groove segments 42'', 44'', 46'' 48'' and each percentage of the entire groove 18'' that is located within each groove segment 42'', 44'', 46'', 48''. FIG. 6a shows a third embodiment of the steel disk 10''' wherein the groove 18''' is an "inverted Y-2" shape wherein one groove inlet 56' branches into two groove outlets 58'. FIG. 6b is an enlarged view of the third embodiment of the steel disk 10''' showing groove segments 42''', 44''', 46''', 48''' and each percentage of the entire groove 18''' that is located within each groove segment 42''', 44''', 46''', 48'''. FIG. 7a shows a fourth embodiment of the steel disk 10''''wherein the groove 18''''is an "inverted Y-3" shape wherein one groove inlet 56'' branches into two groove outlets 58''. FIG. 7b is an enlarged view of the fourth embodiment of the steel disk 10'''' showing groove segments 42'''', 44'''', 46'''', 48'''' and each percentage of the entire groove 18'''' that is located within each groove segment 42'''', 44'''', 46'''', 48''''.

In each of the embodiments illustrated in FIGS. 4a-7b, it is apparent that the cooling fluid 16, which flows through the grooves 18, flows from the friction material outer peripheral edge 54 to the friction material inner peripheral edge 55 because the smallest cross sectional area (located at 48), which is representative of the cooling fluid inlet, is located adjacent to the friction material outer peripheral edge 54.

FIG. 8 is a tabular illustration of the groove areas and temperature range distributions in the embodiments of the friction plates 10 shown in FIGS. 4a-7b. The groove 18' areas and temperature range distribution for the first groove 18' embodiment, as shown in FIGS. 4a and 4b, is shown at 60. The groove 18'' areas and temperature range distribution for the second groove 18'' embodiment, as shown in FIGS. 5a and 5b, is shown at 62. The groove 18''' areas and temperature range distribution for the third groove 18''' embodiment, as shown in FIGS. 6a and 6b, is shown at 64. The groove 18'''' areas and temperature range distribution for the fourth groove 18'''' embodiment, as shown in FIGS. 7a and 7b, is shown at 66.

Any groove 18 shape that has the smallest cross-sectional area at the cooling fluid inlet and the largest cross-sectional area in the area between the cooling fluid inlet and the cooling fluid outlet is within the scope of the present invention and can be further adapted to increase its efficiency by other factors, such as minimizing the distance from the center of the friction material 24 to the grooves 18 to allow for more heat transfer from the steel disks 14 to the cooling fluid 16.

The present invention also comprises a method of producing a more even temperature distribution in a clutch 12, as illustrated in FIG. 1a. Referring to FIG. 1b, the method comprises directing cooling fluid 16 in a groove 18 located on a friction plate 10 adjacent to a steel disk 14. The groove 18 may be formed in the actual friction plate 10 or in friction material 24 facing the friction plate 10, as illustrated in FIG. 1b. The cooling fluid 16 is directed from the friction material inner peripheral edge 55 to the friction material outer peripheral edge 54 or from the friction material outer peripheral edge 54 to the friction material inner peripheral edge 55. The cooling fluid 16 is directed through the groove 18 to traverse a smallest cross-sectional area of the groove 18 at the cooling fluid inlet, which may be the friction material outer or inner peripheral edge 54, 55. The cooling fluid 16 traverses a larger cross-sectional area of the grove 18 at the cooling fluid outlet, which may be the friction material outer or inner peripheral edge 54, 55. The cooling fluid 16 traverses the largest cross-sectional area of the groove 18 at a location between the cooling fluid inlet, which may be the friction material outer or inner peripheral edge 54, 55, and the cooling fluid outlet, which may be the friction material outer or inner peripheral edge 54, 55.

While the best modes for carrying out the invention have been described in detail, those familiar with the art to which this invention relates will recognize various alternative designs and embodiments for practicing the invention within the scope of the appended claims.

The invention claimed is:

1. A friction plate adapted for use in a clutch in association with a steel disk having a disk inner peripheral edge, a disk outer peripheral edge, and a disk facing surface, said friction plate comprising:

a friction plate facing surface juxtaposed with the disk facing surface, said disk facing surface having at least one predetermined hot spot area;

said friction plate facing surface having a plurality of grooves formed therein to carry cooling fluid from one of a friction plate inner peripheral edge and a friction plate outer peripheral edge to the other of said friction plate inner peripheral edge and said friction plate outer peripheral edge to enhance cooling of said steel disk; and said grooves each having a groove inlet cross-sectional area, a groove central cross-sectional area, and a groove outlet cross-sectional area, wherein said groove outlet cross-sectional area is larger than said groove inlet cross-sectional area and said groove central cross-sectional area is larger than said groove outlet cross-sectional area;

wherein said groove central cross-sectional area is oriented adjacent the at least one predetermined hot spot area and configured to attain a near-uniform radial temperature distribution across the disk facing surface.

2. The friction plate of claim 1 wherein said grooves are formed by cutting.

3. The friction plate of claim 1 wherein said grooves are formed by pressing.

4. The friction plate of claim 1 wherein each said groove has two or more branches through which the cooling fluid may flow.

5. The friction plate of claim 1 wherein each said groove has at least two openings to said friction plate outer peripheral edge.

6. The friction plate of claim 1, wherein each of said grooves defines a pot-shaped profile characterized by a single inlet opening and a single outlet opening.

7. The friction plate of claim 6, wherein said groove inlet cross-sectional area, groove outlet cross-sectional area, and groove central cross-sectional area are approximately 5.5%, 7.9%, and 86.5%, respectively, of a total groove cross-sectional area.

8. A friction plate adapted for use in a clutch in association with a steel disk having a disk inner peripheral edge, a disk outer peripheral edge, and a disk facing surface, said friction plate comprising:

a friction plate facing surface juxtaposed with the disk facing surface, said disk facing surface having at least one predetermined hot spot area;

said friction plate facing surface having a plurality of grooves formed therein to carry cooling fluid from one of a friction plate inner peripheral edge and a friction plate outer peripheral edge to the other of said friction plate inner peripheral edge and said friction plate outer peripheral edge to enhance cooling of said steel disk; and said grooves each having a groove inlet cross-sectional area, a groove central cross-sectional area, and a groove outlet cross-sectional area, wherein said groove outlet cross-sectional area is larger than said groove inlet cross-sectional area and said groove central cross-sectional area is larger than said groove outlet cross-sectional area;

wherein said groove central cross-sectional area is oriented adjacent the at least one predetermined hot spot area and configured to attain a near-uniform radial temperature distribution across the disk facing surface; and wherein each said groove has at least two openings to said friction plate inner peripheral edge.

9. The friction plate of claim 8, wherein each of said grooves defines a Y-shaped polygon profile bounded on all sides by straight line segments.

10. The friction plate of claim 9, wherein said groove inlet cross-sectional area, groove outlet cross-sectional area, and groove central cross-sectional area are approximately 5-6%, 7-9%, and 85-88%, respectively, of a total groove cross-sectional area.

11. A method of producing a more even temperature distribution in a clutch, the method comprising:

directing cooling fluid in a groove located on a friction plate, adjacent to a steel disk having at least one predetermined hot spot area, from one of a friction plate inner peripheral edge and a friction plate outer peripheral edge to the other of said friction plate inner peripheral edge and said friction plate outer peripheral edge; and directing said cooling fluid through said groove to traverse a smallest cross-sectional area of said groove at a cooling fluid inlet, to traverse a larger cross-sectional area of said groove at a cooling outlet, and to traverse a largest cross-sectional area of said groove oriented adjacent the at least one predetermined hot spot area at a location between said cooling fluid inlet and a cooling fluid outlet;

selecting a value for each of said groove cross-sectional areas to provide near-uniform radial temperature distribution across said steel disk adjacent said groove.

* * * * *